United States Patent [19]

Nukiyama

[11] Patent Number: 4,649,512
[45] Date of Patent: Mar. 10, 1987

[54] INTERFACE CIRCUIT HAVING A SHIFT REGISTER INSERTED BETWEEN A DATA TRANSMISSION UNIT AND A DATA RECEPTION UNIT

[75] Inventor: Tomoji Nukiyama, Tokyo, Japan

[73] Assignee: NEC Corporation, Tokyo, Japan

[21] Appl. No.: 514,902

[22] Filed: Jul. 18, 1983

[30] Foreign Application Priority Data

Jul. 16, 1982 [JP] Japan .................. 57-123876

[51] Int. Cl.[4] ................. G06F 3/00; G06F 5/00
[52] U.S. Cl. ...................... 364/900; 377/66
[58] Field of Search ... 364/200 MS File, 900 MS File, 364/200, 900; 377/66, 81, 77, 71, 73, 51, 54

[56] References Cited

U.S. PATENT DOCUMENTS

| 3,166,715 | 1/1965 | Cogar | 377/66 |
| 3,516,074 | 6/1970 | Enomoto et al. | 364/200 |
| 3,753,241 | 8/1973 | Bayne | 364/900 |
| 3,838,345 | 9/1974 | Schneider | 377/66 |
| 4,058,773 | 11/1977 | Clark et al. | 377/66 |
| 4,079,456 | 3/1978 | Lunsford et al. | 364/200 |
| 4,268,902 | 5/1981 | Berglund et al. | 364/200 |
| 4,423,482 | 12/1983 | Hargrove et al. | 364/200 |

OTHER PUBLICATIONS

IBM Tech. Discl. Bull. vol. 14, No. 7, "Sequential Buffer Control", by R. L. Adams, Jr., Dec. 1971, pp. 2069-2070.

IBM Tech. Discl. Bull. vol. 6, No. 3, "Dribble Down Buffer", by R. H. Terlet, Aug. 1963, pp. 38-39.

Primary Examiner—James D. Thomas
Assistant Examiner—William G. Niessen
Attorney, Agent, or Firm—Sughrue, Mion, Zinn, Macpeak & Seas

[57] ABSTRACT

An interface unit for connecting a transmitting unit to a receiving unit, the transmitting being capable of transmitting data at a speed greater than the processing speed of the receiving unit. The interface includes a serially connected multistage register which receives input data from the transmitting unit at its input stage and reads out data stored in its output stage to the receiving unit. It also includes a control circuit and a counter storing a count corresponding to the quantity of data stored in the register, the counter being incremented by one each time data is added to the register and decremented by one each time data is read from the register output stage. The control circuit is composed of a decoder and write control circuit. The decoder provides a signal to the write control circuit indicative of the count in the counter. When a datum is to be received from the transmitting unit, it signals the interface through a gate circuit, this signal incrementing the memory. This increment is sensed by the decoder which enables the write control circuit to cause the input data to be written into the first available register stage closest to the output stage. When the register is full, this information is provided to the transmitting unit by the decoder to inhibit the generation of additional data to the interface until an empty stage is available in the register.

5 Claims, 3 Drawing Figures

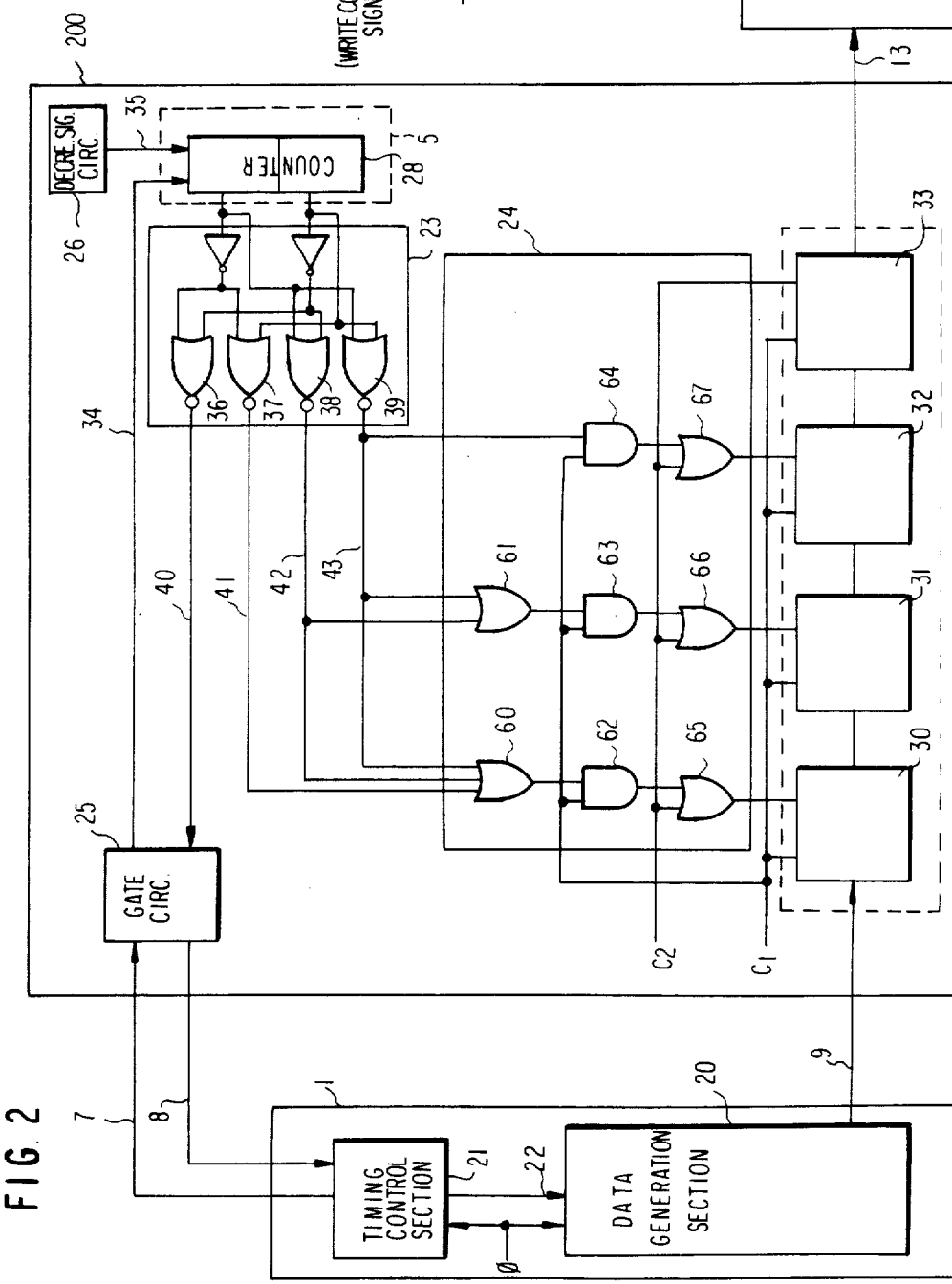
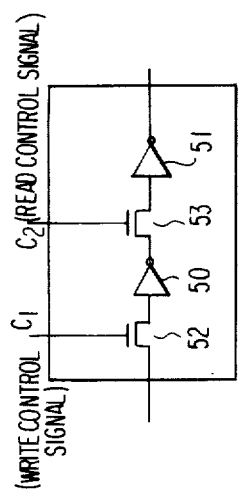

INTERFACE CIRCUIT HAVING A SHIFT REGISTER INSERTED BETWEEN A DATA TRANSMISSION UNIT AND A DATA RECEPTION UNIT

BACKGROUND OF THE INVENTION

1. Field of the Invention

This invention relates to an interface circuit, and more particularly, to an interface circuit adaptable for information transmission between processors having different operating speeds.

2. Description of the Prior Art

Development of digital processing techniques and integrated circuit techniques has made it possible to fabricate a control circuit and/or a memory circuit on a semiconductor chip. The operation of a control circuit and/or a memory circuit formed on a single chip is controlled by clock pulses. A data processing system includes a plurality of chips coupled to each other by signal buses through which information is transferred. When a plurality of chips are coupled by the signal bus, timing control of the data transmission between the chips is required. Here, if all the chips coupled by the bus are controlled by a common clock pulse, the frequency of the timing pulse must be equal to the operating frequency of the chip having the lowest operating speed. Thus, the throughput of the system drops down and high speed processing can not be expected. It is not possible, on the other hand, to use the clock pulse of the chip having the highest operating speed as the timing pulse for information transmission. In order to obtain a system having a high throughput, each chip must be individually subjected to separate timing control. In this case, however, interfacing the chips becomes difficult for an interface circuit must then be disposed between chips having different operating speeds. Such an interface must be made so as not to interfere operation of the chips.

With the background described above, an interface circuit using a first-in-first-out memory (hereinafter referred to as the "FIFO memory") has been widely used. The FIFO memory is constructed in such a manner that data are read out in the sequence in which they are written. A read operation and a write operation of the data are controlled by addressing means. Therefore, the timing of data input and data output during data transmission can be controlled relatively freely. However, another problem occurs in that the hardware circuit for the address control becomes very complicated. More specifically, the memory requires an address generation circuit, an address decoder circuit, a read pointer, a write pointer and a circuit for designating the memory location in which data is stored.

A FIFO memory having a simplified address control circuit is disclosed in U.S. Pat. No. 4,459,681 which issued on July 10, 1984 and assigned to the same Assignee of this Application. It consists of a memory section and a control section but does not need an address generation circuit, an address decoder, a write pointer and a read pointer. Accordingly, this prior art circuit provides the advantage that the size of the interface circuit can be reduced. On the other hand, the control section of the FIFO memory of this prior art circuit requires a plurality of delay type flip-flops (D-F.F). The states of these flip-flops are changed by read/write control signals, and transferred data are written from the output stage of the memory section and transferred to a receiver in accordance with the states of the D-F.Fs.

However, this FIFO memory needs, in addition to a control section, a memory section into which data is written. It it is conceivable, in principle, to use a shift register in place of the memory section. The size of the shift register is smaller than that of the memory section. However, when using the shift register synchronization of the transmitting chip with the receiving chip is extremely difficult because the shift speed is different from the operating speeds of both the transmitter and the receiver.

A data processing chip (a pipeline processor) having pipeline processing circuits will be considered as an example of a data receiving chip. The pipeline processor includes a plurality of pipeline stages coupled in series, with each stage being separated by a pipeline latch circuit. Thus, each stage can be operated in parallel in a predetermined pipeline cycle. Data derived from a transmitter is applied to a first stage in response to a pipeline clock and is sequentially shifted to the subsequent stages during each pipeline cycle. The data thus shifted is processed at each stage as the occasion arises with the result being taken out from the output stage.

The maximum processing capacity of the pipeline is realized when data to be processed are applied to all the pipeline stages. In practice, however, effective data to be processed do not always exist at all the stages. Accordingly, whenever no data appears at a data input, a NOP (no operation) cycle occurs at each stage. To effectively use the pipeline, therefore, it is desirable to apply the data, to be applied to the pipeline, as continuously as possible. A pipeline cycle is determined by the processing instructions at the pipeline stage and is limited by the hardware circuit used. In order to apply the data in every pipeline cycle, as continuously as possible, a device operable at a high speed equal to or higher than the pipeline speed should be provided as a transmitter. Ideally, a transmitting device should operate in synchronism with the pipeline cycle but such operation is very difficult to realize in practice. Even if data to be applied to the pipeline is produced in a cycle shorter than the pipeline cycle, missmatching will occur in an interface unless it is out of synchronism with the pipeline cycle. For example, the data, which is generated immediately after the pipeline cycle, can not be applied to a first pipeline stage at that timing even though data does not exist at the first pipeline stage. As a result, the data to be processed must be held until the next pipeline cycle. In such a case, an empty cycle always occurs in the pipeline cycle and hence, the processing speed efficiency drops.

This shortcoming occurs not only in an interface between chips but also in an interface between a processor unit and a peripheral unit such as a keyboard unit, a printer unit and a display unit. Moreover, even if an interface circuit is built in either a transmitting section or a receiving section, the shortcoming can not be omitted. Further, even if a common system clock is used as the basic clock for each unit, when the operating speed (for example, data input/output speed) of each unit is different from each other, the shortcoming described above may also occur.

As described above, in a processor to which a plurality of data sets to be processed are transferred in series, an interface circuit is particularly important. Particularly, in a system wherein a master processor operating at high speed and slave controllers (e.g., keyboard controllers, printer controllers, display controllers, etc.) operating at low speeds are included, an interface circuit is necessarily required. The interface circuit may be either disposed between a master side and a slave side or be incorporated in the master side or the slave side. Especially in the latter case, the interface circuit in a device or on a chip is preferably as small as possible. Further, the interface circuit is also required for a device whose high speed circuit portion and low speed circuit portion are formed on the same chip.

SUMMARY OF THE INVENTION

It is an object of the present invention to provide an interface circuit whose size is extremely reduced.

It is another object of the present invention to provide an interface circuit which is suitably used for the data transmission between devices operating at different processing speeds.

It is still another object of the present invention to provide an interface circuit having high data transmission efficiency.

It is a further object of the present invention to provide an interface circuit which can improve the effective processing speed of a pipeline processor.

It is a further object of the present invention to provide an interface circuit which can be easily integrated in a device or on a semiconductor chip.

It is a further object of the present invention to provide an interface circuit which is suitably used for coupling a transmission circuit and a reception circuit that operate asynchronously.

It is a further object of the present invention to provide a pipeline processor chip or a pipeline processor system which receives data generated at high speed or a plurality of data successively generated.

An interface circuit in accordance with the present invention comprises a plurality of register stages coupled in series; first means for applying in common a first clock signal for writing data into the register stages; second means for applying in common a second clock signal at a different phase from that of the first clock signal for reading data from the register stages; an indication circuit for indicating the state of the data stored in the register stages; and a control circuit for controlling the input data in a manner such that the input data is written into a register stage which is positioned just before the register stage in which the data previously inputted has been stored in accordance with the state of the indication circuit. In this way the input data are sequentially written into the register stages such that the first input data is written into the output stage of the register. The data are sequentially read out of the register output stage in response to the second clock signal. Preferably, the indication circuit is capable of indicating the number of data stored in the register stages. If four register stages are serially coupled, a 2-bit counter can be used as the indication circuit. The count in the 2-bit counter is increased by one whenever the input data are applied to the registers and is decreased by one whenever the written data are derived from the register output stage. As a result, the content of the 2-bit counter becomes equal to the number of data that are stored in the four register stages. It is required to inhibit the application of input data to the register stages when the 2-bit counter is full, in order to avoid overflow of the counter. Accordingly, the control circuit generates a signal for designating whether or not the counter is full.

A data transmission unit sends a data transfer request signal to the interface circuit according to the designating signal. This data transfer request signal may be used as an increment signal for the 2-bit counter. In other words, data transmission between the transmission unit and the interface circuit of the present invention is controlled by a "hand shake". The control circuit, further, generates a read control signal in accordance with the state of the indication circuit (the 2-bit counter). The read control signal is selectively applied to register stages except for the register output stage, at the same time when the first clock signal is applied to the registers. That is, at this state, an input data passes through the registers to which the read control signal is applied and is written into the register stage positioned just after the register stages through which the input data passes.

If new input data are transferred to the interface circuit of the present invention when the previous data has been stored only in the output stage of the four register stages, the control circuit generates the read control signal dictated by the 2-bit counter (the indication circuit). The content of the counter is "0, 1" at this time. Therefore, the read control signal is applied to the first and the second stages. On the other hand, the first clock signal is commonly applied to the four register stages at this time. As a result, the new input data passes through the first and the second stages and are stored directly in the third stage. Thereafter, the counter is incremented by one. A read operation of the register stages is controlled by the second clock signal which may be used as a timing signal of a receiver unit coupled to the output stage of the interface circuit. However, it will be required that the first clock signal not be overlapped with the second clock signal. The first clock signal may be of a higher frequency than that of the second clock signal. Therefore, in this manner, data generated at a high speed on the transmission side can be stored in the register stages without being restricted by a low processing speed of a data receiver. On the other hand, when data is read out from the fourth stage, the content of the counter is counted down by one. The remaining data in the preceding stages are shifted to the subsequent stages in response to the second clock signal. Memory equipment capable of passing data when the first control signal and the read control signal of the control circuit are simultaneously applied thereto can be used in place of the register stages. Furthermore, the first clock signal may be generated within the interface circuit or may be applied from the transmission side to the interface circuit.

When the interface circuit of the present invention is combined with a pipeline processor, pipeline processing can be executed continuously without an empty cycle in the pipeline processing. In such a case, the interface circuit is placed before the pipeline latch of the initial pipeline stage. The second clock signal is applied to the register stages at a timing which is in synchronism with the pipeline cycle. On the other hand, input data can be received by the register stages at a timing which is equal to the pipeline cycle or which is shorter than the pipeline cycle. Accordingly, higher performance can be obtained while hardware circuit size can be extremely minimized.

Other features and advantages of this invention will be apparent from the following description of preferred embodiments of this invention taken conjunction with the accompanying drawings, wherein:

BRIEF DESCRIPTION OF THE DRAWINGS

FIG. 2 is a block diagram of an interface circuit in accordance with the present invention; and FIG. 3 is a block diagram showing an embodiment of registers forming a shift register shown in FIG. 2.

DESCRIPTION OF THE PREFERRED EMBODIMENTS

Figure 1:
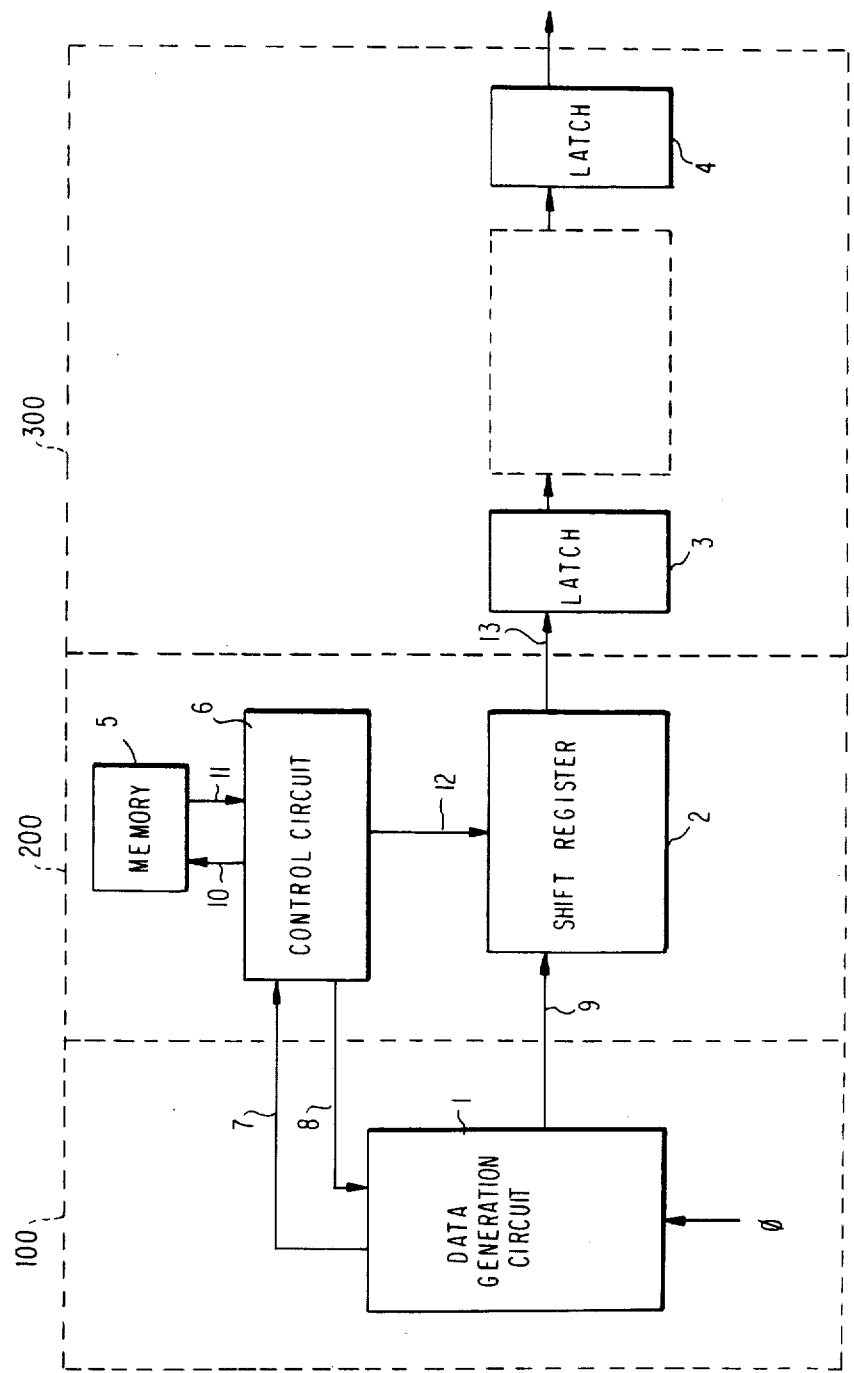
FIG. 1 is a block diagram of a pipeline processing system including an interface circuit in accordance with one embodiment of the present invention.

FIG. 1 is a block diagram of a data processing system using an interface circuit in accordance with one embodiment of the present invention. The circuitry within dotted line 100 represents a transmitting unit, the circuitry within dotted line 200 represents an interface circuit in accordance with one embodiment of the present invention and the circuitry within dotted line 300 represents a data processing unit (for example, a pipeline processor). The data processing unit is coupled to the transmitting unit 100 via the interface circuit 200. The transmitting unit 100 includes a data generation circuit 1 which generates data to be transferred to the pipeline processor 300. The data generation circuit 1 generates data to be processed by the processor 300 in a cycle which is equal to the pipeline cycle or in a cycle shorter than the pipeline cycle. Therefore, the timing of the output from a shift register 2 of the interface circuit 200 may be synchronized with the processing time of the pipeline processor, that is the pipeline cycle. Data 9 generated by the data generation circuit 1 is applied to the initial stage of the shift register 2. The data shifted through is transferred from the final stage to the latch 3 at the initial stage of the pipeline processor 300.

The shift operation of the shift register 2 is controlled by a control circuit 6. Information representative of the number of data stored in the shift register is set into a memory 5. The control circuit 6 applies a control signal 10 to the memory 2 whenever data input/output occurs, so as to change the content of the memory 5. The content 11 of the memory 5 is applied to the control circuit 6 which decodes the number of the data stored in the shift register 2. The control circuit 6 generates the control signal 12 in accordance with the result of decoding and executes a write control of an input data 9. When data 9 to be transferred to the pipeline processor 300 is ready, the transmission unit 100 sends a data transmission request signal 7 to the control circuit 6. Then, the control circuit 6 decodes the content 11 of the memory 5 and returns an answer signal 8 representative of whether the data transmission is permitted or prohibited. In other words, the interface circuit 200 and the transmission unit 100 operate in the two-line type hand shake mode. Of course, the transmission unit 100 may produce the request signal 7 in accordance with the answer signal 8.

The pipeline processor 300 includes a series circuit of a plurality of pipeline stages including a latch 3 of a first stage and a latch 4 of a last stage data sent from the interface circuit 200 is processed sequentially at each pipeline stage so that the final result is produced as data 13.

FIG. 2 shows a suitable embodiment of the interface circuit shown in FIG. 1. The block 200 corresponds to the interface circuit. The block 1 is the data generation circuit of the transmission unit (represented by reference number 100 in FIG. 1). It includes a data genera-tion section 20 and a timing control section 21. The timing control section 21 applies a signal 22 for controlling the output timing of the data to the data generation section 20. The interface circuit 200 includes a memory 5, the shift register 2 and the control circuit. The control circuit includes the circuit elements of the block 200 other than the shift register 2 and the memory 5. That is, the control circuit includes a decoder 23 for decoding the content of the memory 5, a shift and write control circuit 24 for controlling a shift operation and a write operation of the shift register 2 on the basis of the decoded signal, a gate circuit 25 for a effecting hand shake interface with the transmission unit 1 and for applying an increment signal 34 to the memory 5, and a circuit 26 for applying a decrement signal 35 to the memory 5. An output 13 from the shift register 2 is applied to the latch 3 of the initial stage of the pipeline processor.

It will be assumed that the data generation section 1 on the transmission side generates data at a higher speed than a pipeline speed. The shift register has four stages serially coupled to each other. In the drawing, each stage 30–33 of the shift register 2 is composed of a four-stage delay type flip-flop (hereinafter referred to as "D-F.F") as illustrated in FIG. 3. Each D-F.F. is controlled by a data write signal $C_1$ and a data read signal $C_2$. Each register (D-F.F) may be of a dynamic type or of a static type. FIG. 3 illustrates an example of D-F.F of a dynamic type D-F.F. The D-F.F shown in the drawing consists of two inverter circuits 50, 51 and two transfer gates 52, 53. These members 50 through 53 are coupled in series. The transfer gate 52 is controlled by the data write signal $C_1$ while the transfer gate 53 is controlled by the data read signal $C_2$ and a read control signal of the write control circuit 24 in FIG. 2. clock signals are used for these data write and read signals, respectively. An input data is applied to the inverter 50 in response to the write clock $C_1$, is held there and is thereafter taken out in response to the read clock $C_2$ through the invertor 51.

A 2-bit binary counter 28 capable of up-counting and down-counting is used as the memory 5. This counter 28 acts as a size counter for indicating the number of data which is stored in the shift register 2. The counter 28 is reset to "0,0" when no data is applied to the shift register 2, that is, when data is not stored in all of the D-F.F.s 30 through 33. Whenever the data 9 is subsequently applied, the counter 28 is incremented by one. On the other hand, the counter is decremented by one whenever the data is taken out from D-F.F 33. A count-up signal, that is an increment signal 34, is applied from the gate circuit 25. The gate circuit 25 sends the increment signal 34 to the counter 28 on the basis of the data input request signal 7 sent from the data generation section 1. On the other hand, a count-down signal, that is, an decrement signal 35, is produced from a circuit 26. This circuit 26 produces the decrement signal 35 whenever the shift register 2 outputs data to the pipeline latch 3 in response to the clock $C_2$. Incidentally, the increment signal 34 and the decrement signal 35 may be produced simultaneously in the practical operation, but the content of the counter 28 does not change in such a case.

The content of the counter is decoded by the decoder 23 and the decoded output is produced from NOR gates 36 through 39, respectively. The NOR gate 36 produces a high level signal 40 when the content of the counter 28 is (1, 1). The NOR gates 39, 38, 37 produce high level signals 43, 42, 41, respectively, when the content of the counter 28 is (0,0), (0,1) and (1,0). The signal 41 is sent to an AND gate 62 through an OR gate 60 of the write control circuit 24. The signal 42 is sent to AND gates 62 and 63 via OR gates 60 and 61, respectively. The signal 43 is sent to the AND gates 62 and 63 via the OR gates 60 and 61, respectively, and is also sent directly to an AND gate 64. The AND gates 62 through 64 are subjected to timing control by the write clock $C_1$. In other words, the decode signals 41 through 43 are applied to the shift register 2 via OR gates 65 through 67 in synchronism with the write clock $C_1$. The read clock $C_2$ is applied in common to these OR gates 65 through 67. Accordingly, the read operation of the shift register is controlled by the read clock $C_2$ and by the decode signals 41 through 43. Since the decode signals 41 through 43 are in synchronism with the write clock $C_1$, they are applied to the shift register simultaneously when the write clock $C_1$ is applied to the shift register 2. Accordingly, the data is not stored in a D-F.F but passes through it as it is in this case.

When the counter 28 is (0, 0), the signal 43 is produced. This signal 43 is simultaneously applied to the AND gates 62 through 64 and to the read clock input terminal of each D-F.F 30 through 32 of the shift register 2 in synchronism with the write clock $C_1$. Accordingly, the input data 9 passes through these D-F.Fs 30 through 32 and is written into the D-F.F of the fourth stage.

When the counter 28 is (0, 1), on the other hand, the signal 42 is produced. This signal 42 is simultaneously applied to the AND gates 62 and 63 and is also applied together with the write clock $C_1$ to D-F.Fs 30 and 31. Accordingly, the input data 9 passes through D-F.Fs 30 and 31 and is directly written into D-F.F 32 of the third stage.

Furthermore, when the counter 28 is (1, 0), the signal 41 is produced. This signal 41 is applied only to the AND gate 62 and is applied together with the write clock $C_1$ to D-F.F 30. As a result, the input data passes through only D-F.F 30 of the first stage and is set in D-F.F 31 of the second stage. When the counter is (1, 0) and when the data generation section 1 outputs the data input request signal 7, the counter 28 is counted up by one, by the increment signal 34, to (1, 1). In this case, the input data is set in D-F.F 30 of the initial stage in synchronism with the write clock $C_1$.

Finally, when the counter 28 is (1, 1), an over flow signal 40 representing that the shift register 2 is full is produced from the NOR gate 36. As a result, the gate circuit 25 sends a signal 8 prohibiting input to the data generation section 1.

On the other hand, whenever the data in D-F.F 33 of the final stage is produced to the latch 3 during a pipeline cycle, the content of the counter 28 is decreased by one. Furthermore, the data in D-F.Fs 30 through 32 are shifted to the next stages by the read clock $C_2$. In other words, the data which are to be subjected to pipeline processing can be written directly from D-F.F 33 of the final stage.

Next, a data flow at the time of pipeline processing in practice will be described with reference to FIG. 1.

When an input data A to the pipeline is first generated, the transmission unit 100 generates a request signal 7. In the initial stage, no input exists beforehand and the pipeline latch 3 is empty. Hence, the data that is applied passes through the shift register 2 and is directly set into the pipeline latch 3 in response to the read clock $C_2$. The data A thus set to the latch 3 is transferred to the pipeline latch of the next stage in a next pipeline cycle. On the other hand, since the transmission unit operates in a cycle faster than the pipeline cycle, it is possible that a new input data B is generated before the input data A is shifter to a second pipeline stage, depending upon the processing condition. In such a case, the request signal 7 is generated while the previous data A remains latched in the pipeline latch 3. This is represented by the memory 5 which stores the input condition. In this state, the content of the memory 5 is "0, 0". As a result, the new data B passes through the registers of the previous stages and is set to the register of the final stage (D-F.F 33).

The data B thus set is delivered from the shift register to the pipeline latch 3 when the data A of the pipeline latch 3 is shifted in the next pipeline cycle. Namely, the interface circuit receives input data from the transmission unit in the write clock cycle and delivers the data to the pipeline processor in the pipeline clock (equal to a pipeline cycle). If input data are set to all the registers of the shift register 2, a next new request signal 7 is inhibited by the answer signal 8. That is, the two-line type hand shake interface is constituted by the request signal 7 and the answer signal 8. Thus, processing can not be executed in a cycle exceeding the pipeline cycle when the system is considered as a whole.

In this embodiment, the read control signals (decoded signals 41 to 43) are applied to the shift register 2 at times different from those when an application of the read clock $C_2$. That is, the read control signals are applied to the shift register 2 at the same time write clock $C_1$ are applied. Therefore, in order to avoid an overlap of the write clock $C_1$ and the read clock $C_2$, the write clock $C_1$ must be generated with a timing different from that of read clock $C_2$.

As described above, the interface circuit of the present invention is a very simple circuit by which the idea of passing input data through a shift register in a manner determined by the number of data stored in the shift register is implemented in a very effective manner. Therefore, a reliable interface between a high speed transmitter and a low speed receiver can be realized. Particularly, in a pipeline system, undesired NOP cycles of a pipeline processor can be substantially reduced by coupling the interface circuit of this invention to an input portion. The interface circuit acts as a queue memory in the input portion. Therefore, even if the frequency of the write clock $C_1$ is the same frequency as the read clock $C_2$, the interface circuit remains very effective to eliminate an idle cycle when the pipeline processor is busy and cannot accept input data. Namely, the interface circuit can accept input data which are transferred at a pipeline cycle, and can transfer the input data to the pipeline processor whenever the pipeline processor can receive the input data without an empty (idle) cycle.

What is claimed is:

1. An interface circuit inserted between a data transmission unit and a data reception unit comprising a shift register having a plurality of serially coupled register stages, each register stage having a data input gate, a data storage means for storing data applied thereto through the data input gate, and a data output gate, first means for applying a write control signal in common to the data input gates of said register stages to turn on each data input gate, a second means for supplying a read control signal in common to the data output gates of said register stages to turn on each data output gate, a first bus coupled to the first register stage of said shift register for applying data from said data transmission unit to said input gate of said first register state, a second bus coupled to the last register stage of said shift register for deriving data stored in the last register, a counter counting the number of data applied to said first register stage through said first bus, and a control circuit coupled to said shift register and said counter and applying said write control signal to the output gate or gates of such register stage or stages that is selected by the output of said counter at the same time when said write control signal is applied to the data input gates of the register stages in common, whereby both the data input gate and the data output gate of the selected register stage or stages are simultaneously turned on by said write control signal to directly transfer a data through said selected register stage or stages.

2. An interface circuit as claimed in claim 1, further comprising means for receiving a data transfer request signal from said data transmission unit, said receiving means being coupled to said counter to increase the count number according to the received data transfer request signal.

3. An interface circuit as claimed in claim 1, wherein said counter decreases the count number according to said read control signal.

4. An interface circuit comprising a shift register having a plurality of register stages serially coupled to each other, a first means coupled to an initial register stage of said shift register for applying data in serial to said shift register, a second means coupled to a last register stage of said shift register for deriving data in serial therefrom, each register stage having an input gate, a storage means and an output gate, a third means coupled in common to the input gate of each register stage for turning on the input gate of each register stage simultaneously with a first signal, a fourth means coupled to the output gate of each register stage for turning on the output gate of each register stage by a second control signal at different timing when the input gate of each register is turned on by said first signal, a fifth means for designating at least one of said plurality of register stages through which a data applied thereto is to be transferred, and a sixth means coupled to said shift register and to said fifth means for applying said first signal to the output gate or gates of the designated register stage or stages when said input gates of said register stages are simultaneously turned on with said first signal by said third means.

5. An interface circuit as claimed in claim 4, wherein the data applied from said first means is written into a register stage subsequent to said designated register stage or stages through said designated register stage or stages.

* * * * *